INVENTORS
JAMES M. CUNNINGHAM
FRANCIS L. PRATT
GERALD J. WATKINS

BY Francis V. Giolma
ATTORNEY

Sept. 4, 1962 J. M. CUNNINGHAM ET AL 3,052,408

OFFSET PRINT CORRECTION DEVICE

Filed June 29, 1959 2 Sheets-Sheet 2

United States Patent Office 3,052,408

Patented Sept. 4, 1962

3,052,408

OFFSET PRINT CORRECTION DEVICE

James M. Cunningham, Francis L. Pratt, and Gerald J. Watkins, all of Endicott, N.Y., assignors to International Business Machines Corporation, New York, N.Y., a corporation of New York Filed June 29, 1959, Ser. No. 823,655
5 Claims. (Cl. 235—61.11)

This invention relates generally to document readers, and it has reference in particular to an offset print correction device for document readers.

In a system for reading pencil marks or the like from a document on which they are arranged in columns, it is necessary to provide means for accurately aligning the columns with the reading elements in order to compensate for tolerances in the paper feed and in printing. Ordinarily registration is accomplished by reference to registration marks on the document. These marks are sensed, and control means are operated thereby to move the document until adequate registration is achieved. Where the document is sufficiently large and is moving sufficiently fast, it becomes impractical to adjust the position of the document laterally. Where columnar information is sensed on both sides of a document at the same time, this prevents shifting the document to correct offset registration.

In order to overcome these difficulties, it is proposed to provide separate and distinct registration patterns printed on both sides adjacent the leading edge of the document. These patterns are separately sensed by photocells to create signals having a time interval therebetween which is proportional to the degree of lateral misalignment between the center lines of the columns and their respective photocells. The interval between the signals is digitized and the result stored in a binary counter, which at a convenient time is read and controls the position of a laterally movable shield or mask which defines the column sensing zones. The position of the mask insures that the photocells and the document will be correctly aligned so that the photocells look at the centers of their respective columns.

Generally stated, it is an object of the invention to provide for determining in a document reader the amount of document lateral offset and for effecting relative movement of a document and reading means to correct the offset condition.

More specifically, it is an object of the present invention to provide a registration pattern near the leading edge of a document which produces a signal in accordance with the lateral misalignment of the document and sensing devices and for using the signal to correct the misalignment.

Another object of the invention is to provide for producing a number of timed signals proportional to the misalignment between a document being read and the reading means.

Yet another object of the invention is to provide for scanning a document through a laterally movable shield which defines the areas scanned and for adjusting the lateral position of the shield in accordance with misalignment of the document and the scanning means.

A further object of the invention is to provide for using registration patterns on both sides of a document being read and for independently shifting means on each side of the document to effect a lateral shift of the areas being read in order to correct individual offset conditions.

It is also an object of the invention to provide for using a registration pattern on a document to be scanned, which produces a variable number of pulse signals dependent upon the misalignment of the document and scanning means and for using these signals to effect corresponding realignment of the scanning area on the document.

Another important object of the invention is to provide for using a cyclically reset scanning shield for defining the locations of a plurality of columns to be scanned in a document and for effecting incremental shifts in the relative positioning of the shield and document in accordance with pulse signals produced by offset detection means.

It is also an important object of the invention to provide for using a counter to control a plurality of electromagnetic operating means to reposition a scanning shield different amounts for reading a moving document in accordance with a plurality of signals produced by an offset alignment detector.

The foregoing and other objects, features and advantages of the invention will be apparent from the following more particular description of a preferred embodiment of the invention, as illustrated in the accompanying drawings.

Figure 1:
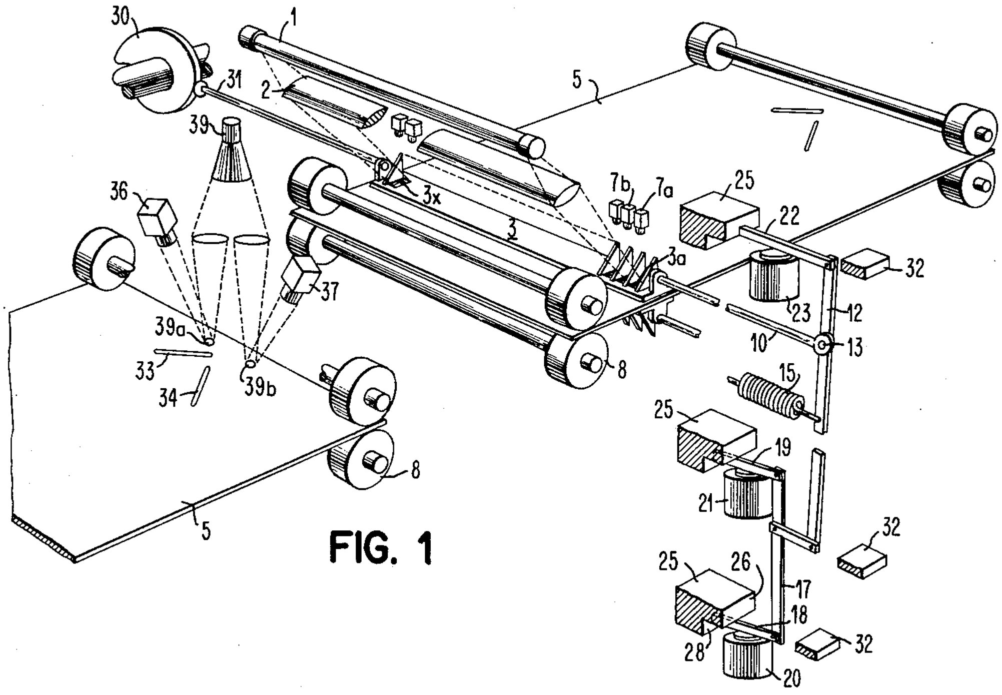
FIG. 1 is a partial schematic isometric view of document reading apparatus embodying the invention in one of its forms.

Referring particularly to FIG. 1, it will be seen that a continuous source of light such as a lamp 1 is utilized in connection with a cylindrical lens 2 and a laterally movable shield or mask 3 having a plurality of openings 3*a*, 3*x*, etc., therein with suitable baffles therebetween for projecting a plurality of lines of light on a document 5 having columns of information arranged lengthwise in side-by-side relation and corresponding to the holes 3*a*, etc., which are to be scanned by photosensitive means, such as phototransistors or the like 7*a*, 7*b*, etc. The mask 3 thus defines the fields of view of phototransistors 7*a*, 7*b*. A plurality of feed rolls 8 are provided in conjunction with suitable driving means, not shown, for feeding the document in a well-known manner past the sensing means. While sensing means are shown for the upper side of the document only, it is to be understood that similar sensing means are also used for scanning the lower side of the document. Since the sensing means are substantially of the same nature, the lower ones have been omitted from the drawing in order to simplify the showing.

In order to provide for aligning the columns of information on the document 5 with the sensing means 7*a*, 7*b*, etc., provision is made for moving the shield 3 laterally so as to move the areas in which the lines of light are formed on the document. For example, the shield may be connected by means of a rod 10 to a lever 12 by means of a pivot 13. A spring 15 fixed to the lever 12 intermediate its ends normally biases the lever 12 towards the left. At its lower end, the lever 12 is pivotally connected to another lever 17 having armatures 18 and 19 connected adjacent the ends and disposed to be controlled by electromagnets 20 and 21, respectively. At its upper end, the lever 12 is provided with an armature 22 similarly controlled by an electromagnet 23. Stops 25 are provided for each of the armatures having a face 26 against which the armature rests in the latched or reset position, and a notched or recessed surface portion 28 against which the armature rests when in the unlatched or set position.

The lever 12 is connected to the lever 17 one-third the distance from its upper end, and the rod 10 is connected to the lever 12 three-sevenths the distance from its upper end. The shield 3 is effectively reset to an initial or rest position by means of a cam 30 which engages a push rod 31, the cam 30 being operatively connected with the feed rolls 8 so as to be driven in synchronism with operation of the feed. When the cam resets the shield 3, the levers 12 and 17 will be urged to the right against stops 32 so that the armatures 18, 19 and 22 latch against the faces 26 of the stops 25 in the latched position. When, for example, the electromagnet 20 is energized, the armature 18 is pulled downwardly to clear the face 26, and the lower end of the lever 17 moves to the left until the armature 18 engages the stop base 28. This permits the pivot point 13, at which the rod 10 is attached, to move one unit distance to the left. When the electromagnet 21 is energized to attract its armature 18, the upper end of lever 17 moves to the left and the pivot point 13 of the lever 12 moves two units to the left. If electromagnets 20 and 21 are energized, the pivot point 13 moves a total of three units to the left. When the electromagnet 23 is energized to unlatch the armature 22, the upper end of lever 12 moves to the left and pivot point 13 moves a distance equal to four units. Thus by selectively energizing the magnets 20, 21 and 23, the pivot point 13, and hence, the movable shield 3, may be selectively moved from zero to seven units to the left in order to correct offset registration. The cam 30 operates each cycle to reset the shield 3 and the lever mechanism to the latched position.

In order to provide for selectively controlling the magnets 20, 21 and 23, means such as the chevron-like offset registration marks 33 and 34 are provided adjacent the leading edge of the document 5, these marks being offset longitudinally of each other as shown, and inclined laterally, so as to be selectively scanned by photosensitive scanning means such as phototransistors 36 and 37 when they traverse and affect laterally spaced spots of light 39*a* and 39*b* produced by the light source 39. From FIG. 1 and FIG. 3, it may be seen that the interval between the pulses produced by the photocells 36 and 37 scanning the registration marks 33 and 34, respectively, will be affected by the extent to which the center line of the pattern varies from the center of the distance between the spots 39*a* and 39*b*. Assuming that the document speed is constant, an interval of time $t1$ will be measured if the paper passes the registration sensing station in relation to the light spots shown by the solid line pattern. A different time interval $t2$ will be measured if the paper passes the sensing station in the relation indicated by the pattern which is caused by an offset condition.

Figure 3:
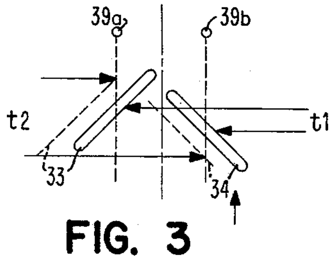
FIG. 3 is an enlarged schematic showing of the arrangement of the offset registration alignment marks in FIG. 1.

Referring generally to FIG. 3 of the drawings, it will be seen that in each of the various control devices, the individual components or units making up that device are indicated merely as a box or block. The specific circuitry of such blocks will not be generally described as applied to various forms of tubes, diode circuits, etc. A detailed description of the necessary typical coincidence switches or AND circuits, mixes or OR circuits, inverters, single and double latches along with cathode followers, power tubes, and the like where required, and which would be applicable or necessary to apparatus of this type, is shown and described in the F. E. Hamilton et al. application, Serial No. 544,520, now Patent No. 2,959,351, filed November 5, 1955, and assigned to the assignee of the present invention.

For the purpose of this description, a typical coincident switch shown as a triangle, otherwise known as a logical AND circuit or diode switch, comprises diodes or the like, not shown, each including an individual input terminal normally biased negative so that the common terminal is at a negative potential with respect to ground. If coincident pulses are applied to all input terminals, the potential of the output terminal is raised. However, if only one of the input terminals is pulsed positively, the potential of the common output terminal is not raised appreciably. Any voltage responsive device may be controlled by the potential of the output terminal to furnish a usable output voltage level whenever a coincidence of positive input pulses is detected.

A typical mix, otherwise known as a logical OR circuit or diode mix, may also comprise diodes or the like. In the present drawings to distinguish diode mixes from diode switches, the former is shown as an arc of a circle. Any suitable voltage responsive device is controlled by the potential of the common output terminal of the diode mix. This terminal is connected by a suitable resistor to a negative voltage source, not shown, and maintains a negative bias in the related grid of the tube. Each diode is connected to an individual input terminal, which in turn is connected in the electrical circuit. If either one or all of the diode input terminals is pulsed positively, the potential of the output terminal is raised which permits the tubes associated therewith to conduct or operate in the predetermined manner.

Hereinafter in the specification wherein a conductor or circuit terminal or the like is referred to as being positive or negative in potential, this does not necessarily mean that the point in question is positive or negative in an absolute sense, but is more positive or more negative to its previous state. This principle also applies to any description wherein positive or negative pulses are mentioned or referred to as up or down or raised or lowered.

While cathode followers, inverters, or the like are not always shown in detail, it is to be understood that various types may be utilized in different locations and the circuits may involve various resistant values and capacity couplings to produce the desired outputs. Since the particular cathode followers and inverters used are not part of the invention, a detailed description of each possible type is not deemed necessary, likewise in the drawings all power tubes, inverters, double inverters, and the like which would be normally required to maintain the proper signal levels have for the purpose of simplicity been either shown only in block form or eliminated. The type and number and particular location would depend upon the results desired. Generally, a single latch comprises a double inverter and cathode follower which responds to an input signal to raise the output of the cathode follower, which in turn supplies the desired signal and has a feedback leading to the input to maintain the cathode follower conducting. The latch is turned off by interrupting the latchback signal. A more detailed explanation is provided in the E. S. Hughes, Jr. Patent 2,628,309, issued February 10, 1953.

Figure 5:
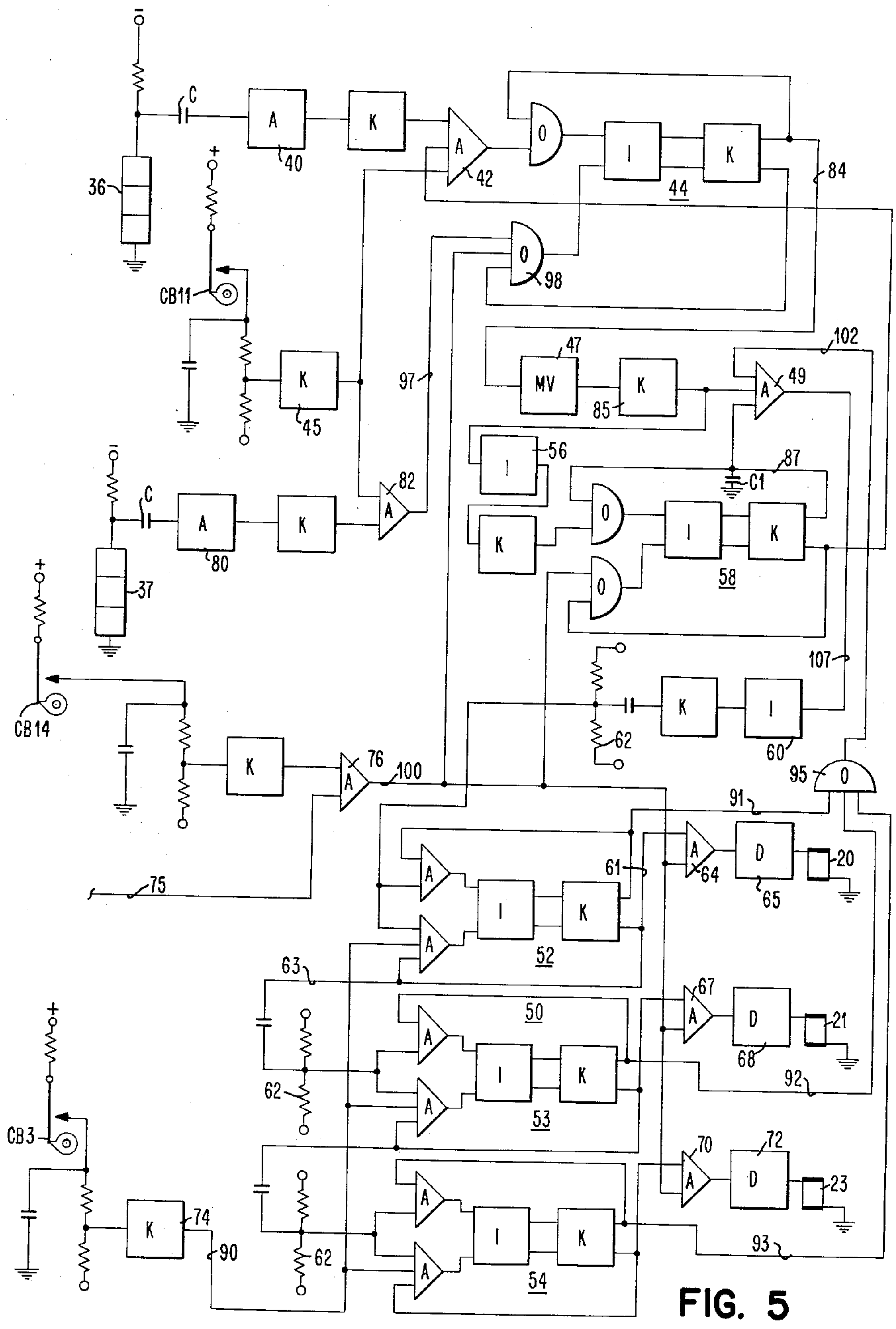
FIG. 5 is a schematic diagram in block form of a control circuit for the offset registration correction apparatus of FIG. 1.

Referring to FIG. 5 of the drawings, it will be seen that a photosensitive device such as the phototransistor 36 is connected by means of a capacitor C to an inverter amplifier 40 and a cathode follower K and thence AND switch 42 for controlling a latch 44 comprising a double inverter I and a cathode follower K with OR inputs O as described in the above-mentioned Hughes patent. This signal from the phototransistor 36 is gated with a level shift signal from a cam circuit breaker CB11 and cathode follower 45 so as to insure the leading edge of the sheet being past the phototransistor prior to activation of the circuit. The cam CV11 is operatively connected with the feed rolls of FIG. 1 so as to time the impulse therefrom in accordance with movement of the document. The latch 44 controls a multivibrator 47 which applies a signal through a cathode follower K to a switch 49 for controlling the operation of a counter 50 comprising modified Hughes latches, each consisting of an inverter and a cathode follower and identified by the numerals 52, 53 and 54, respectively, for selectively controlling the operation of the magnets 20, 21 and 23. In accordance with the pulses produced by the multivibrator 47, an inverter 56 is utilized to take the output signal from the multivibrator 47 and invert it for controlling a latch 58 and apply a gating signal to the switch 49 so as to delay the control of the multivbirator to prevent an early count. A capacitor C1 is utilized to delay the rise time of the output of cathode follower K of latch 58 to avoid a race between it and the fall time of cathode follower 85.

The output signal from switch 49 is applied through an inverter 60 and a cathode follower K to a differentiating circuit 62, and thence to the first stage 52 of the counter 50 which applies a signal over line 61 through a switch 64 and drives amplifier 65 to effect operation of the electromagnet 20 in response to the first pulse counted from the multivibrator 47. The second pulse from the multivibrator 47 turns the first stage 52 off, and the off output over line 63 similarly drives the second stage 53 through differentiating circuit 62 to effect operation of the electromagnet 21 through a switch 67 and drive amplifier 68. The third pulse turns the second stage 53 off and the third stage 54 of the binary counter is operated in response to the off output of the second stage 53 to effect energization of its electromagnet 23 through switch 70 and drive amplifier 72. Reset of the counter is effected by a negative pulse developed by opening circuit breaker CB3, through a cathode follower 74. A signal from a start relay over line 75 and a pulse from a circuit breaker CB14 through a switch 76 is used to condition the switches 64, 67 and 70 as well as reset latch 58 and latch 44 in the event that it fails to otherwise turn off. The off output from cathode follower K of latch 58 is gated at switch 42 to prevent spurious noise signals, etc., from starting a false interval count.

The phototransistor 37 is connected through an inverter amplifier 80 and a cathode follower K to a switch 82 and thence through a mix 98 for applying a signal to the inverter I of the latch 44 for turning the latch 44 off when the offset registration mark 34 is sensed.

In operation, when the photocell 36 senses the registration mark 33, a negative pulse is applied through the inverter amplifier 40 to the switch 42 for operating the switch in conjunction with a level shift signal from the circuit breaker cam CB11 and the cathode follower 45. This insures that the leading edge of the document will be past the photocells prior to the activation of the circuits. The output of switch 42 is applied through an OR mix circuit O to the latch 44, turning it on and raising the output line 84. This applies a signal to the multivibrator 47, causing it to emit pulses. The output of the multivibrator 47 is a square wave and its frequency is established to cause one pulse for each three one hundred twelfths of an inch of misregistration. Thus if the printing registration with respect to the light spots 39*a* and 39*b* varies between zero and three sixteenths of an inch, a minimum of zero and a maximum of seven pulses must be generated. Since a square wave changes level twice in completing half a cycle, and the change in level of the multivibrator causes the counter to advance, it is necessary to omit the first half wave from the multivibrator in order to prevent an early count. When the output line 85 of the multivibrator rises as the result of the first half from the multivibrator, its rise is differentiated and inverted by the inverter 56, whose output turns the latch 58 on. Since latch 58 requires a positive pulse to turn on, it is evident that the end of a first half pulse will cause this action to turn on latch 58 raising the line 87, which helps to condition the switch 49 for transmittal of pulses from a multivibrator. Integrator C1 delays rise of latch 58 output to insure multivibrator output is fully down.

Figure 2:
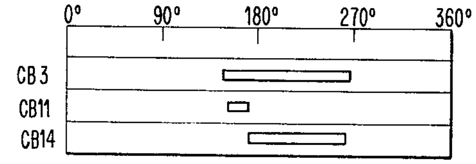
FIG. 2 is a timing chart showing the relative timing of circuit breakers used in controlling offset registration correction means.

Earlier in the previous machine cycle, a negative pulse from circuit breaker CB3, which opens around 276° as shown in the FIG. 2, is supplied over line 90 through the preset gate of the counterstages 52, 53 and 54 to reset them. This raises the output line 91, 92 and 93, any one of which is operative to condition the switch 49 through the OR mix 95. The switch 49 should now operate to pass pulses from the multivibrator 47, which are stored in the latch counter 50, which is described in the August, 1958, IBM Technical Disclosure Bulletin on page 27 under the title of "Complementary Pulse Generator" by F. J. Droege and G. J. Watkins. Pulses from the multivibrator 47 will cease when the phototransistor 37 recognizes the offset registration pattern 34, and causes a pulse to raise the level on the line 97 for switching the latch 44 off through the OR mix 98, thus lowering the level of the output line 84. When circuit breaker CB14 closes, between approximately 170° and 255° on the timing chart, the output line of switch 76 is raised and the switches 64, 67 and 70 are conditioned for reading out the contents of the counter 50 to energize particular ones of the magnets 20, 21 and 23, respectively.

Referring particularly to FIG. 1, it will be seen that when the magnets 20, 21 or 23 are energized, their armatures 18, 19 and 22 are respectively urged downwardly, and are permitted to move to the left to engage the set stop faces 28, as is in the positions shown for the armatures 18 and 19. With the armatures 18 and 19 in the position shown, this indicates a count of three in the counter 50 and the pivot point 13 of the lever 12 is moved a total of three units to the left by the spring 15, thus adjusting the movable shield 3 to register light from the source 1 with the columns of information on the document 5 being scanned. Should the magnet 23 be energized alone, the armature 22 would be drawn downwardly from the reset position shown and move to the left permitting the pivot 13 to move a total of four units, and should all three armatures be attracted, the total movement of the pivot 13 is accumulative, or a distance or a total of seven units. At the end of the reading cycle, the high point of the cam 13 actuates the push rod 31 to move the shield back to its original position and reset the armatures 18, 19 and 22.

Referring to FIG. 5, it will be evident that when the binary counter 50 is full each of the output lines 91, 92 and 93 will be down, so that the mix 95 drops the line 102 and prevents the multivibrator 47 from causing the counter 50 to spill over and start a new count. Should the phototransistor 37 fail to originate a stop count pulse for any reason, the latch 44 will be reset to the off condition by change in the level on the line 100 when the circuit breaker CB14 closes.

Figure 4:
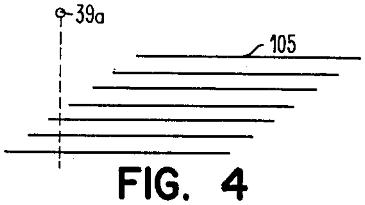
FIG. 4 is an enlarged schematic showing of a different arrangement of offset registration detection marks.

FIG. 4 illustrates an offset registration pattern which also offers advantages. In this pattern a plurality of horizontal lines 105 which may be scanned by means of a single photosensitive device 36 are each offset by an equal amount corresponding to one increment of correction resulting from the operation of the magnets 20, 21 and 23. As the document advances in the direction of the arrow, the spot of light 39*a* will cross one or more lines, depending upon the lateral relationship between the spot of light and the line pattern. Pulses generated by the phototransistor 36, for example, may be fed directly into the counter 50 on line 107 from the output of the switch 42, thus omitting the multivibrator 47, latch 44 and latch 58. Otherwise the circuitry is substantially the same, and the counter 50 operates in the identical manner to count the number of pulses produced by the phototransistor 36.

From the above description and the accompanying drawings, it will be apparent that a simple and effective offset registration correction system has been provided wherein simultaneous reading or scanning of two sides of a relatively large document may be made, and independent alignment of the sensing or reading means on both sides of the document may be readily made without requiring lateral movement of the document or movement of an extensive scanning system. By producing pulses in accordance with the amount of offset and storing the count in a binary counter, it is possible to effect actuation of the mask at a convenient time in the scanning cycle. While the description has been made with reference to phototransistors, it should be realized that other sensing means such as solar cells may also be used within the scope of the invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In apparatus for sensing a plurality of separate documents each having a plurality of columns of information thereon and having a plurality of separate registration indicia thereon, means for feeding the documents in seriatim, sensing means for each column including a laterally movable element for correcting relative lateral offset of the document and sensing means, control means selectively operable to move said movable element different predetermined amounts, means including a pulse generator selectively controlled by the registration indicia to produce different numbers of pulses in accordance with lateral offset of the indicia on each document, counter means controlled by said pulses to effect selective operation of the control means to move the movable elements to correct for offset of each document, and means for cyclically resetting the movable element in accordance with feeding of said document.

2. In apparatus for feeding longitudinally separate documents each having columns of information thereon and having a plurality of lateral registration indicia having different amounts of lateral displacement longitudinally of the document, sensing means for each column including a laterally movable shield, electromagnetic control means selectively operable to effect lateral movement of the shield different predetermined amounts from a rest position, additional sensing means for producing a plurality of pulses in accordance with the lateral registration of each document, counting means operated by said pulses to effect selective operation of the control means to move the shield different amounts for each document, and a cyclically operated cam for actuating the shield to return it to the rest position in predetermined relation to the feeding of each document.

3. In apparatus for sensing columns of data on each of a plurality of separate documents each having a pair of longitudinally displaced and progressively laterally offset registration marks, sensing means for each column including a laterally movable shield, feed means for moving the documents in seriatim past the sensing means, control means selectively operable to move the shield different amounts from a rest position, counting means for effecting selective operation of the control means, a pulse generator connected to effect operation of the counting means in accordance with the number of pulses, means including sensing means for the offset registration marks for effecting operation of the pulse generator to produce different numbers of pulses in accordance with the offset error of each document, and reset means operated by the feed means to return the shield to the rest position after each document is fed.

4. In apparatus for correcting offset registration of each of a plurality of longitudinally moving documents each having a plurality of side-by-side columns of information and having a plurality of inclined offset registration indicia, sensing means for said columns of information on each of said documents including a laterally movable shield, feed means for moving the documents past the sensing means, means including a counter for selectively moving the shield different predetermined amounts laterally of the direction of feed, a pulse generator connected to effect selective operation of the counter, and control means selectively operable to turn the pulse generator on and off to produce different numbers of pulses in accordance with the relative lateral position of the registration indicia of each document.

5. In apparatus for reading columns of information during an operating cycle from one of a plurality of separate documents each having a plurality of longitudinally spaced registration lines with the ends thereof progressively more offset, reading means for said columns including a shield movable laterally from an initial position and having openings for each column, electromagnetic control means for effecting different predetermined selective amounts of lateral movement of the shield, a counter connected to effect selective operation of the control means for each document, sensing means controlled by the offset end portion of the registration lines of each document for effecting selective control of the counter to move the shield in accordance with offset of each of the documents, and cyclically operable reset means for returning the shield to an initial position at the end of the reading cycle for each document.

References Cited in the file of this patent

UNITED STATES PATENTS

| | | |
|---|---|---|
| 2,674,916 | Smith | Apr. 13, 1954 |
| 2,820,907 | Silverman | Jan. 21, 1958 |
| 2,840,371 | Frommer | June 29, 1958 |